US012657968B2

(12) United States Patent
Naserian et al.

(10) Patent No.: US 12,657,968 B2
(45) Date of Patent: Jun. 16, 2026

(54) SYSTEM AND METHOD FOR COLLISION MATCHING AND INFORMATION EXCHANGE

(71) Applicant: GM GLOBAL TECHNOLOGY OPERATIONS LLC, Detroit, MI (US)

(72) Inventors: Mohammad Naserian, Windsor (CA); Daniel Xie, Markham (CA); Patrick Giancarlo Gabriel DiGioacchino, Niagara Falls (CA); Utkarsh Saini, Pickering (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 18/939,670

(22) Filed: Nov. 7, 2024

(65) Prior Publication Data

US 2026/0127919 A1     May 7, 2026

(51) Int. Cl.
*G07C 5/00*          (2006.01)
*G06Q 40/08*         (2012.01)
          (Continued)

(52) U.S. Cl.
CPC ............. *G07C 5/008* (2013.01); *G06Q 40/08* (2013.01); *G06V 10/764* (2022.01);
          (Continued)

(58) Field of Classification Search
None
See application file for complete search history.

(56) References Cited

U.S. PATENT DOCUMENTS 8,024,330  B1     9/2011  Franco et al.
9,406,336  B2     8/2016  Bose et al.
          (Continued)

FOREIGN PATENT DOCUMENTS

DE          1271448  A1     1/2003
DE     102016112908  A1     1/2017
          (Continued)

OTHER PUBLICATIONS

C. P. Young, B. R. Chang and T.-Y. Wei, "Highway vehicle accident reconstruction using Cooperative Collision Warning based Motor Vehicle Event Data Recorder," 2009 IEEE Intelligent Vehicles Symposium, Xi'an, China, 2009, pp. 1131-1136, doi: 10.1109/IVS. 2009.5164441. (Year: 2009).
          (Continued)

*Primary Examiner* — Ramon A. Mercado
*Assistant Examiner* — David Ruben Pedersen
(74) *Attorney, Agent, or Firm* — Ingrassia Fisher & Lorenz, LLP | IF&L

(57)          ABSTRACT

A system of a first vehicle automatically exchanging collision reports with a second vehicle is provided. The vehicle system includes a collision detection verification module in electrical communication with a plurality of sensors and a vehicle database. The collision detection module detects whether a collision event has occurred between the first vehicle and the second vehicle based on the sensed vehicle data acquired, broadcasts a first collision message when the collision event has occurred, and exchanges, with the second vehicle, a first collision report for a second collision report based on the first collision message. The first collision report includes a first driver insurance information associated with the first vehicle and the second collision report includes a second driver insurance information associated with the second vehicle.

18 Claims, 6 Drawing Sheets

(51) Int. Cl.
| | |
|---|---|
| *G06V 10/764* | (2022.01) |
| *G06V 10/80* | (2022.01) |
| *G06V 20/58* | (2022.01) |
| *H04L 9/30* | (2006.01) |

(52) U.S. Cl.
CPC ............ *G06V 10/803* (2022.01); *G06V 20/58* (2022.01); *H04L 9/30* (2013.01); *G06V 2201/08* (2022.01)

(56) References Cited

U.S. PATENT DOCUMENTS

| | | | |
|---|---|---|---|
| 9,619,891 B2 | 4/2017 | Bose et al. | |
| 9,866,673 B2 | 1/2018 | Gabel | |
| 9,947,215 B2 | 4/2018 | DiCenso et al. | |
| 10,032,226 B1 | 7/2018 | Suizzo et al. | |
| 10,089,869 B1* | 10/2018 | Makled | G08G 1/0175 |
| 10,324,463 B1 | 6/2019 | Konrardy et al. | |
| 10,360,601 B1 | 7/2019 | Adegan | |
| 10,373,259 B1 | 8/2019 | Konrardy et al. | |
| 10,387,962 B1 | 8/2019 | Potter et al. | |
| 10,395,332 B1 | 8/2019 | Konrardy et al. | |
| 10,504,302 B1 | 12/2019 | Chavez et al. | |
| 10,848,913 B2 | 11/2020 | Pal et al. | |
| 10,861,320 B2 | 12/2020 | Martin et al. | |
| 11,256,823 B2 | 2/2022 | Baird, III et al. | |
| 11,352,034 B2 | 6/2022 | Ross et al. | |
| 11,669,090 B2* | 6/2023 | Konrardy | G05D 1/617 |
| | | | 701/23 |
| 11,820,320 B2 | 11/2023 | Yang et al. | |
| 11,868,599 B2 | 1/2024 | Conlon et al. | |
| 11,949,807 B1 | 4/2024 | Jackson | |
| 11,990,160 B2 | 5/2024 | Bose et al. | |
| 12,175,578 B1 | 12/2024 | Campbell | |
| 12,459,459 B2 | 11/2025 | Wang et al. | |
| 2003/0023476 A1 | 1/2003 | Gainey | |
| 2006/0269104 A1 | 11/2006 | Ciolli | |
| 2007/0087756 A1 | 4/2007 | Hoffberg | |
| 2011/0016377 A1 | 1/2011 | Caldwell et al. | |
| 2014/0009275 A1* | 1/2014 | Bowers | G06Q 20/145 |
| | | | 340/436 |
| 2015/0356793 A1 | 12/2015 | Dietz et al. | |
| 2016/0036899 A1 | 2/2016 | Moody et al. | |
| 2016/0286156 A1 | 9/2016 | Kovac | |
| 2016/0294493 A2 | 10/2016 | Daoura et al. | |
| 2017/0025007 A1 | 1/2017 | Hyde et al. | |
| 2017/0300503 A1 | 10/2017 | Wang et al. | |
| 2019/0043351 A1 | 2/2019 | Yang et al. | |
| 2020/0327343 A1* | 10/2020 | Lund | G06T 7/50 |
| 2021/0266732 A1* | 8/2021 | Zhou | H04L 9/3247 |
| 2022/0303765 A1* | 9/2022 | Zhou | H04L 9/3247 |
| 2022/0366368 A1 | 11/2022 | Simpson | |
| 2023/0098246 A1 | 3/2023 | Simpson | |
| 2023/0252889 A1* | 8/2023 | Lepp | G08G 1/205 |
| | | | 701/117 |
| 2023/0260049 A1* | 8/2023 | Brandmaier | G08G 1/205 |
| | | | 280/729 |
| 2023/0351298 A1 | 11/2023 | Freis et al. | |
| 2023/0368587 A1* | 11/2023 | Brandmaier | G07C 5/02 |
| 2024/0078903 A1* | 3/2024 | Park | H04L 63/0442 |
| 2024/0193367 A1 | 6/2024 | Juneja et al. | |
| 2024/0331817 A1 | 10/2024 | Lane et al. | |
| 2025/0225865 A1* | 7/2025 | Yang | G08G 1/0141 |

FOREIGN PATENT DOCUMENTS

| | | | |
|---|---|---|---|
| DE | 102017000727 A1 | 7/2017 | |
| DE | 102018111780 A1 | 11/2018 | |
| DE | 102018210211 A1 | 12/2019 | |
| WO | 2023235251 A1 | 12/2023 | |

OTHER PUBLICATIONS

S. U. Rahman and U. Hengartner, "Secure crash reporting in vehicular Ad hoc networks," 2007 Third International Conference on Security and Privacy in Communications Networks and the Workshops—SecureComm 2007, Nice, France, 2007, pp. 443-452, doi: 10.1109/SECCOM.2007.4550365. (Year: 2007).

V. Dankan Gowda, et al, "Design and Implementation of a System for Vehicle Accident Reporting and Tracking," 2022 7th International Conference on Communication and Electronics Systems (ICCES), Coimbatore, India, 2022, pp. 349-353, doi: 10.1109/ICCES54183.2022.9835896. (Year: 2022).

\* cited by examiner

SYSTEM AND METHOD FOR COLLISION MATCHING AND INFORMATION EXCHANGE

INTRODUCTION

The technical field generally relates to vehicle-to-vehicle communication between two vehicles, and more particularly to a system and method for the acquisition and exchange of information concerning a collision incident between the first and second vehicles.

In recent years, advancements in vehicular safety technologies have increasingly focused on improving the ability of vehicles to prevent and mitigate collisions. One significant area of development relates to Vehicle-to-Vehicle (V2V) communication systems, which allows vehicles to exchange information in real time. These systems are designed to enhance situational awareness, enabling vehicles to react to potential hazards before they become imminent threats. A primary use case for V2V communication is the transmission of vehicle data between vehicles after a collision event.

At the present, drivers involved in a collision event conduct time consuming and potentially hazardous steps to exchange respective driver insurance information with each other. In some situations, a driver may determine that an environment where the collision is located does not provide adequate safety and protection to exchange such information. For example, a driver may determine that the circumstances associated with the collision is time-consuming and potentially hazardous to stop their respective vehicles on a side of the road, find insurance related documents, get out of their vehicle, and exchange insurance information with the other driver. Despite advancements in traffic management, challenges also remain in reducing traffic back-up associated with minor vehicle collisions.

The present disclosure seeks to address the above-mentioned issues. Furthermore, other desirable features and characteristics of the variations disclosed herein will become apparent from the subsequent detailed description and the appended claims, taken in conjunction with the accompanying drawings and the foregoing.

SUMMARY

In one aspect, the present disclosure provides a system in a first vehicle for automatically exchanging collision reports with a second vehicle. In the vehicle system, a vehicle database stores a driver insurance record, the driver insurance record includes insurance information, a driver license information, and a vehicle registration information related to a least one user of the first vehicle. A plurality of sensors acquire real-time vehicle data based on detecting a collision event of the first vehicle with an identifiable object. The real-time vehicle data includes vehicle data and image data of a surrounding environment of the first vehicle. A collision detection verification module is in electrical communication with the plurality of sensors and the vehicle database. The collision detection module includes a processing unit to perform the following method for of exchanging a collision report. Sensed vehicle data is acquired from the plurality of sensors distributed through the first vehicle. The sensed vehicle data includes real-time vehicle data of the surrounding environment of the first vehicle. Whether a collision event has occurred between the first vehicle and the second vehicle is detected based on the sensed vehicle data acquired. A first collision message is broadcasted when the collision event has occurred A first collision report is exchanged from the first vehicle with a second collision report from the second vehicle based on the collision even. The first collision report includes a first driver insurance information associated with the first vehicle and the second collision report includes a second driver insurance information associated with the second vehicle.

In one embodiment, the method described above may detect whether the collision event has occurred regarding the first vehicle with a nearest object. The image data of the sensed vehicle data is analyzed to determine whether the nearest object is classified as a classified vehicle when the collision event has been determined, using image processing. A predetermined range around the surrounding area of the first vehicle is scanned to detect a second collision message broadcasted from a nearby vehicle. A verification process is performed on the second collision message to determine whether an identity of the nearby vehicle associated with the second collision message is a same identity as the classified vehicle. The first collision report is encrypted with a public key, when the nearby vehicle shares the same identity as that of the classified vehicle of the image data and is referred to after the verification process as a verified vehicle. An encrypted first collision report for the first vehicle is exchanged for a second encrypted collision report associated with the verified vehicle. The verified vehicle is the second vehicle. A human machine interface associated with the first vehicle may display, a second decrypted driver insurance record based on the second encrypted driver insurance record and a decryption process.

In another embodiment, the plurality of sensors includes a group consisting of: a camera device, LiDar sensor, a RADAR sensor, an impact sensor, an accelerometer, a brake pedal, an ultrasound sensor, or a combination thereof.

In yet another embodiment, the method described above may acquire the image data from at least two of the plurality of sensors and fuses the image data using a sensor fusing algorithm. The fused image data is analyzed to detect an object nearest to the first vehicle. A distance is determined between the first vehicle and the nearest object detected. An image processing technique is performed on the image data to determine a classification of the nearest object detected and the nearest object is classified as the second vehicle.

In one embodiment, the verification process described above may verify the nearby vehicle as the second vehicle when the nearby vehicle is within near or about the distance between the first vehicle and the second vehicle.

In another embodiment, the verification process described above may further verify the nearby vehicle is not the second vehicle when the nearby vehicle is not within near or about the distance between the first vehicle and the second vehicle.

In yet another embodiment, the method described above may process the image data, using an image processing technique, to determine a second vehicle make, a second vehicle model, and a second vehicle color of the classified vehicle associated with the image data. The make, model and color of a nearby vehicle may be compared with the make, model and color associated with the classified vehicle broadcasted in the second collision message. The first collision report is transmitted based the nearby vehicle being identified as the second vehicle of the image data.

In still another embodiment, the first collision message includes a collision event and at least one of a vehicle global positioning location data, a vehicle make, a vehicle color, a vehicle model, or a combination thereof.

In one embodiment, the method described above may receive a second collision message broadcasted from a nearby vehicle about a same or similar time frame as the first vehicle detects the collision event. The first collision report is transmitted based on the second collision message associated with the nearby vehicle.

In another embodiment, the method described above may determine whether to exchange of the first collision report from the first vehicle with the second collision report from the nearby vehicle. An input from a user of the first vehicle is prompted to determine whether to exchange, with the second vehicle, the first collision report for the second collision report. The first collision report is transmitted to the second vehicle based on the input associated with the prompt to determine whether to exchange the first collision report and the second collision report.

In another aspect, the present disclosure includes a method of a vehicle system for a first vehicle that automatically exchanges collision reports with a second vehicle. In this method, sensed vehicle data is acquired from a plurality of sensors distributed through the first vehicle. The sensed vehicle data includes real-time vehicle data and image data of a surrounding environment of the first vehicle. Whether a collision event has occurred between the first vehicle and the second vehicle is detected based on the sensed vehicle data acquired. A first collision message is broadcast from the first vehicle when the collision event has occurred. A first collision report is exchanged from the first vehicle with a second collision report from the second vehicle based on the collision event. The first collision report includes a first driver insurance information associated with the first vehicle and the second collision report includes a second driver insurance information associated with the second vehicle.

In one embodiment, the method described above may detect whether the collision event has occurred regarding the first vehicle with a nearest object. The image data of the sensed vehicle data is analyzed to determine whether the nearest object is classified as a classified vehicle when the collision event has been determined, using image processing. A predetermined range around the surrounding area of the first vehicle is scanned to detect a second collision message broadcasted from a nearby vehicle. A verification process is performed on the second collision message to determine whether an identity of the nearby vehicle associated with the second collision message is the same identity as the classified vehicle. The first collision report is encrypted with a public key, when the nearby vehicle shares the same identity as that of the classified vehicle of the image data and is referred to after the verification process as a verified vehicle. An encrypted first collision report of the first vehicle is exchanged for a second encrypted collision report associated with the verified vehicle, wherein the verified vehicle is the second vehicle. A second decrypted driver insurance record is displayed on a human machine interface of the first vehicle based on the second encrypted driver insurance record and a decryption process.

In another embodiment, the verification process described above may verify the nearby vehicle as the second vehicle when the nearby vehicle is within near or about the distance between the first vehicle and the second vehicle.

In yet another embodiment, the verification process described above may verify the nearby vehicle is not the second vehicle when the nearby vehicle is not within near or about the distance between the first vehicle and the second vehicle.

In still another embodiment, the method described above may process the image data, using an image processing technique, to determine a second vehicle make, a second vehicle model, and a second vehicle color of the classified vehicle associated with image data. A nearby vehicle make, a nearby vehicle model and a nearby vehicle color associated of the nearby vehicle is compared with that broadcasted the second collision message to a classified vehicle make, a classified vehicle model and a classified vehicle color associated with the classified vehicle identified in the image data. The first collision report is transmitted based the nearby vehicle being identified as the second vehicle of the image data.

In one embodiment, the plurality of sensors includes a group consisting of: a camera device, LiDar sensor, a RADAR sensor, an impact sensor, an accelerometer, a brake pedal, an ultrasound sensor, or a combination thereof.

In another embodiment, the method described above may acquire the image data from at least two of the plurality of sensors; fusing the image data using a sensor fusing algorithm. A fused image data is analyzed to detect an object nearest to the first vehicle. A distance between the first vehicle and the nearest object detected is determined. An image processing technique is performed on the image data to determine a classification of the nearest object detected. The nearest object is classified as the second vehicle.

In yet another embodiment, the first collision message includes a collision event and at least one of a vehicle global positioning location data, a vehicle make, a vehicle color, a vehicle model, or a combination thereof.

In another embodiment, the method described above may receive a second collision message broadcasted from a nearby vehicle about a same or similar time frame as the first vehicle detects the collision event. The first collision report is transmitted based on the second collision message associated with the nearby vehicle.

In yet another aspect, the present disclosure includes a method of a vehicle system for a first vehicle that automatically exchanges collision reports with a second vehicle. Sensed vehicle data is acquired from a plurality of sensors distributed through the first vehicle. The sensed vehicle data includes real-time vehicle data and image data of a surrounding environment of the first vehicle. The image data is acquired from at least two sensors and the image data is fused using a sensor fusing algorithm. The fused image data is analyzed to detect an object nearest to the first vehicle. A distance between the first vehicle and the nearest object detected is determined. An image processing technique is performed on the image data to determine a classification of the nearest object detected; and classifying the nearest object as the second vehicle. Whether a collision event has occurred between the first vehicle and the second vehicle is determined based on the sensed vehicle data acquired. A first collision message is broadcast when the collision event has occurred. A predetermined range around the surrounding area of the first vehicle is scanned to detect a second collision message broadcasted from a nearby vehicle. A verification process on the second collision message is performed to determine whether an identity of the nearby vehicle associated with the second collision message is a same identity as the classified vehicle. Verification on the first collision message includes: processing the image data, using an image processing technique, to determine a second vehicle make, a second vehicle model, and a second vehicle color of the classified vehicle associated with image data; and comparing a nearby vehicle make, a nearby vehicle model and a nearby vehicle color associated of the nearby vehicle that broadcasted the second collision message to a classified vehicle make, a classified vehicle model and a classified vehicle color associated with the classified vehicle identified in the image data. The first collision report is encrypted with a public key, when the nearby vehicle shares the same identity as that of the classified vehicle of the image data and is referred to after the verification process as a verified vehicle. An encrypted first collision report of the first vehicle is exchanged for a second encrypted collision report associated with the verified vehicle and the collision event. The encrypted first collision report includes a first driver insurance information associated with the first vehicle and the encrypted second collision report includes a second driver insurance information associated with the second vehicle, and wherein the verified vehicle is the second vehicle. A second decrypted driver insurance record is displayed, using a human machine interface, based on the second encrypted driver insurance record and a decryption process.

BRIEF DESCRIPTION OF THE DRAWINGS

The variations will hereinafter be described in conjunction with the following drawing figures, wherein like numerals denote like elements, and wherein.

DETAILED DESCRIPTION

The following detailed description is merely illustrative in nature and is not intended to limit the application and uses. Furthermore, there is no intention to be bound by any expressed or implied theory presented in the preceding technical field, background, brief summary or the following detailed description.

The present disclosure offers an approach to reduce traffic using V2V communication. The present disclosure utilizes collision-related data for vehicle collisions to provide communication that is consistent, secure, and effective across all vehicles and exchange collision reports having insurance information between the vehicles involved in the collision. This detection and exchange between the vehicles involved in the collision allows the drivers to safely exchange collision reports irrespective of the environment of the collision event and/or time of day associated with the collision. The present disclosure also addresses issues regarding data privacy and cybersecurity, as the sensitive nature of collision-related data and/or collision report could be exploited if not adequately protected.

Additional information related to the subject matter described and claimed herein are provided in following related applications: System and Method for Documenting Vehicular Events (application Ser. No. 18/939,691); Information Gathering and Sharing From A Collision Event (application Ser. No. 18/939,722); and Cloud-Based Application Platform to Search and Retrieve Evidence Records Related to A Vehicular Event (application Ser. No. 18/939, 730). The entire disclosures of each of the above applications are incorporated herein by reference.

Figure 1:
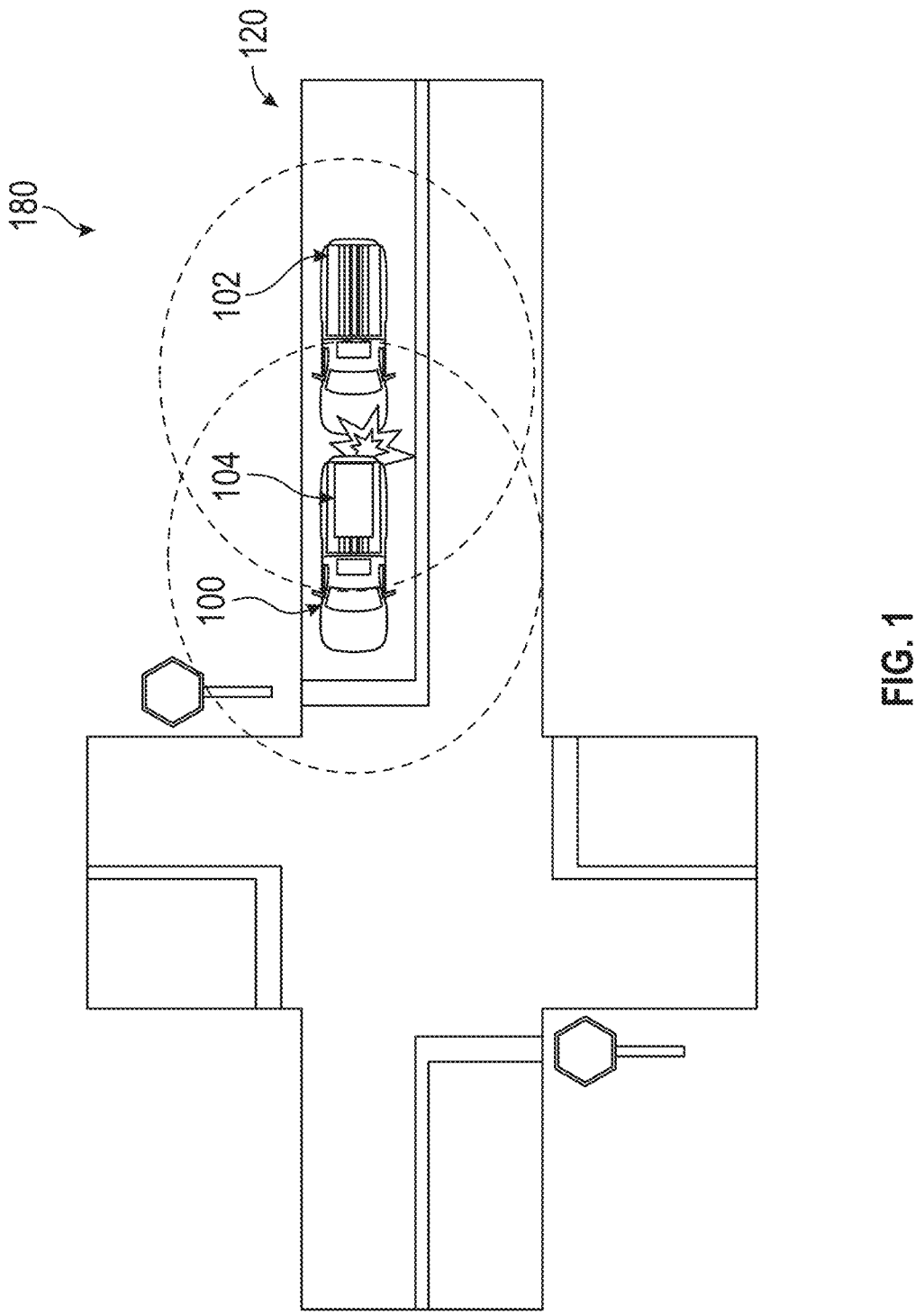
FIG. 1 illustrates an environmental view of a first vehicle having a first vehicle system exchanging a collision report with a second vehicle system of a second vehicle according to the present disclosure.

Referring to FIG. 1, the present disclosure provides a first vehicle 100 located near or about an intersection along a road. In this form, the first vehicle 100 detects a collision event that occurred with a second vehicle 102 and exchanges collision reports with the second vehicle 102. More specifically, the first vehicle 100 and the second vehicle 102 exchange collision reports having driver insurance information associated with users of the respective vehicle based on the collision event being detected between the first vehicle 100 and the second vehicle 102. While FIG. 1 depicts an environment of the first vehicle 100 and the second vehicle 102 located near or about an intersection along a road, the first vehicle 100 and the second vehicle 102 may be located in any location or environment where a collision event may occur. The first vehicle 100 may be parked along a road or a parking lot. In another example, the first vehicle 100 may be traveling along a road or a parking structure.

In one embodiment, the first vehicle 100 is an autonomous or semi-autonomous vehicle in communication with the second vehicle 102. In some embodiments, the first vehicle 100 may include an automobile, a motorcycle, or a truck. In this example, the first vehicle 100 is a passenger vehicle. The first vehicle 100 includes a vehicle system 104. A plurality of components and subsystems distributed within the first vehicle 100 work together to perform one or more functions to achieve particular objectives related to the first vehicle 100 operation, safety, comfort and/or efficiency. These systems can be mechanical, electrical, electronic, hydraulic or a combination of these are designed to ensure that the first vehicle 100 operates and performs effectively under one or more conditions.

In this example, the vehicle system 104 includes a collision detection verification subsystem 108. The collision detection verification subsystem 108 detects whether a collision event occurred and executes an exchange of collision reports between the first vehicle 100 and the second vehicle 102. The first vehicle 100 and the second vehicle 102 include substantially the same features, functions and structures, and therefore for the sake of brevity the description of the second vehicle 102 will not be repeated herein.

Figure 2:
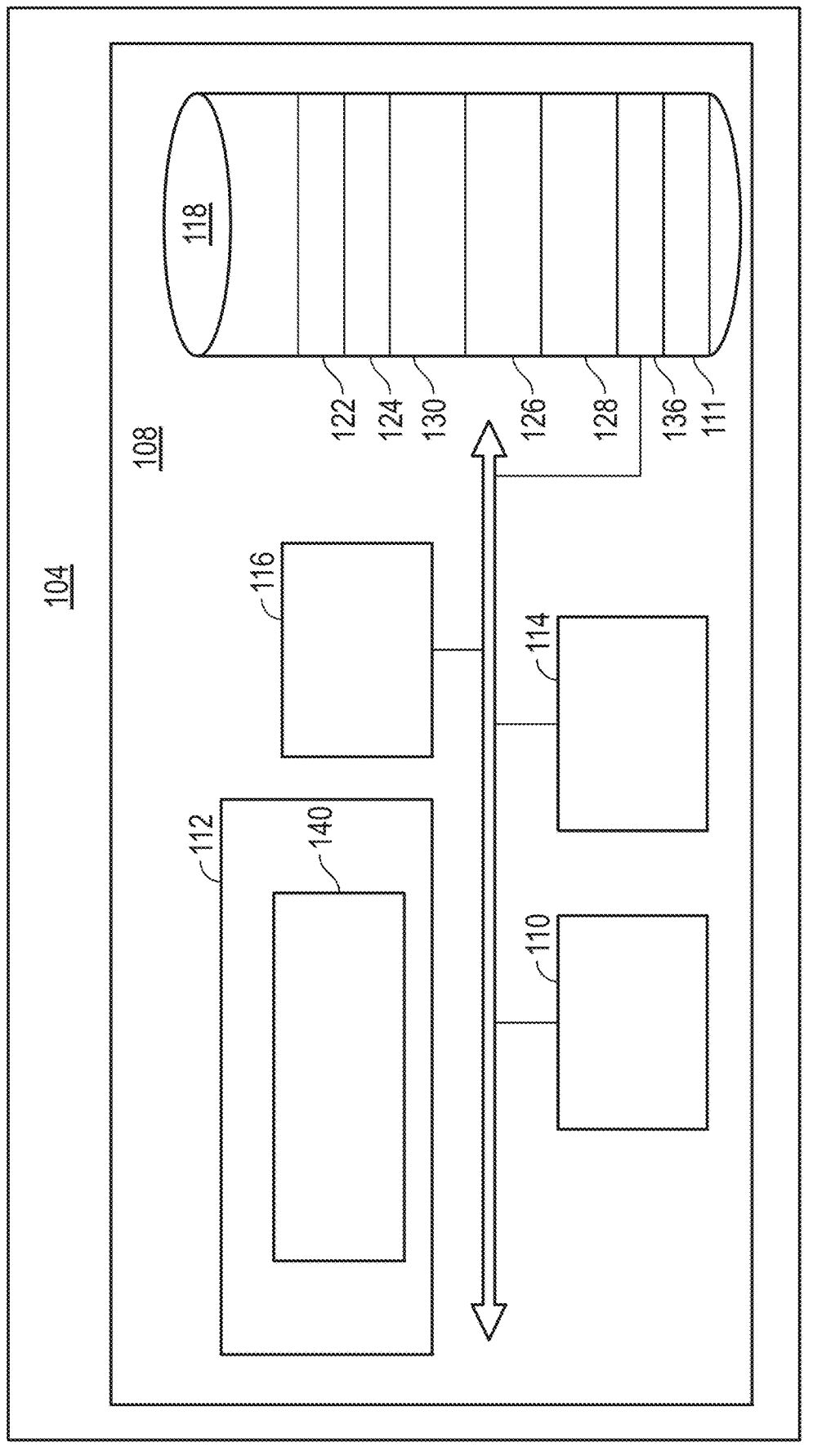
FIG. 2 illustrates a block diagram of the first vehicle system according to the present disclosure.

As shown in FIG. 2, the collision detection verification subsystem 108 includes a plurality of sensors 110, a collision detection verification (CDV) module 112, a human machine interface (HMI) 114, a communication module 116, and a vehicle database 118. The sensors 110 are positioned and located throughout the first vehicle 100 and output sensed data 111 to indicate a collision event between the first vehicle 100 and the second vehicle 102. The sensed data 111 includes real-time raw data related to acceleration (e.g., changes in velocity, direction, and motion), impact data, and image data of a surrounding environment of the first vehicle 100. The image data includes a still image (picture), a moving image (video), or a combination thereof. The sensed data 111 may be used to classify the nearest object 120 also involved in the collision event with the first vehicle 100. The sensed data 111 is stored in the vehicle database 118.

The CDV module 112 includes a processing unit 140. The processing unit 140 may include a processor (not shown), and a non-transitory computer-readable storage medium (not shown) configured to store instructions that are executed by the processor. The CDV module 112 is an electronic control module (ECM) that monitors, detects, and responds to collision related events. The CDV module 112 interfaces with the plurality of sensors to determine whether a collision event has occurred between the first vehicle 100 and a nearest object 120 based on the sensed data acquired. The CDV module 112 also communicates with the communication module 116 to broadcast, using V2V protocols, a first collision message, if a collision event has occurred. The first collision message may include a vehicle collision detected data, a location data of the first vehicle, vehicle make data, vehicle model data, vehicle color data, a vehicle speed data, acceleration data, steering wheel angle data, yaw rate data, brake status data, air bag deployment data, hard braking data, stability control data, path history data, head lights status data, vehicle size data, turn signal status data or a combination thereof. The CDV module 112 also receives a second collision message that is broadcasted by the second vehicle 102.

The CDV module 112 is also in communications with the communication module 116 to exchange respective collision reports 138 between the first vehicle 100 and the second vehicle 102. A collision report 138 generally includes a driver license information 126, a driver insurance information 128, a vehicle registration information 130 or a combination thereof related to a driver of a respective vehicle 100, 102. The collision report 138 may also include collision data acquired from a time period during the collision event. The collision data includes at least a portion of the image data when a collision is detected between the first vehicle 100 and the second vehicle 102, an image of any damage to the first vehicle 100, a number of vehicles identified in the collision event, a location of any damage to the first vehicle 100, a collision time, a geographical location of the collision, vehicle acceleration at the time of the collision, or a combination thereof. The CDV module 112 transmits a first collision report 138 to the second vehicle 102 and receives a second collision report 138 transmitted from the second vehicle 102.

The HMI 114 allows a user to interact with the collision detection verification subsystem 108 and manage various vehicle functions. The HMI 114 displays and audibly issues a prompt and/or response to a user in the first vehicle 100. The HMI 114 includes audio system (not shown) and/or a display screen (not shown), such as a touch screen. The audio system may include a speaker and a microphone. The HMI 114 initiates a first prompt to the user to confirm whether a classified vehicle identified in the image data is the nearest object that collided with the first vehicle 100. The HMI 114 receives a first input from the driver and/or the passenger in response to a prompt to the user to verify the second vehicle of the image data. The first input may be a positive input and a negative input. The positive input indicates that the driver desires to exchange respective collision reports. The negative input indicates that the driver does not desire to exchange respective collision reports. The HMI 114 initiates a second prompt associated with an exchange request to the driver of the first vehicle 100. The exchange request is a second driver input for determining whether to transmit or exchange the first collision report 138. In one embodiment, the HMI 114 enables an input associated with a texting component to exchange alpha numeric text with the second vehicle 102.

The communication module 116 includes a processing unit (i.e., a processor and a non-transitory computer-readable storage medium) configured to execute instructions. The communication module 116 includes a vehicle-to-vehicle (V2V) communication module that enables the broadcasting of messages to nearby vehicles within a predetermined range. The communication module 116 transmits or broadcasts messages (e.g., data packets containing messages or data) using a dedicated communication protocol, such as a dedicated short-range communication (DSRC), Cellular Vehicle-to-Everything (C-V2X), Vehicle-to-Infrastructure (V2I), Vehicle-to-People (V2P), 5GLTE cellular communication, or the like. Using this V2V broadcast protocol, the communication module 116 is able to transmit at low latency to ensure that nearby vehicles can quickly receive and process data from the first vehicle 100. The communication module 116 also manages incoming and outgoing data transmission for a vehicle network of the first vehicle 100. The communication module 116 also employs asymmetric encryption to secure broadcast messages and transmitted or exchanged communication between the first vehicle 100 and the second vehicle 102. The communication module 116 determines whether to exchange the respective collision report 138 between the first vehicle 100 and the second vehicle 102. The communication module 116 initiates an input request to a user of the second vehicle 102 to determine if an exchange of respective collision reports is desired. The communication module 116 determines whether to exchange a respective collision report 138 with the second vehicle 102 when a positive input associated with an exchange request is received from the first vehicle 100 and the second vehicle 102 in response to the prompt associated. The communication module 116 may determine not to exchange the respective collision report between the first vehicle 100 and the second vehicle 102 based on the negative input for the user of the first vehicle 100 and/or the input from the user of the second vehicle 102.

The vehicle database 118 stores and manages data related to operation, performance, and history of the collision detection verification subsystem 108. The vehicle database 118 is in communication with each of the sensors 110, the HMI 114, the communication module 116, and the CDV module 112 to receive and store data. The vehicle database 118 continuously receives and stores data from the collision detection verification subsystem 108. The vehicle database 118 stores at least one of a public key 122, a private key 124, a driver license information 126, a driver insurance information 128, a vehicle registration information 130, a first collision report 138-1, and a second collision report 138-2. From herein, the first collision report 138-1 and the second collision report 138-2 shall be referred to by the reference number 138. The public key 122 is used for securely encrypting the first collision report 138-1 to be transmitted to the second vehicle 102. The private key 124 is kept confidential by the first vehicle 100 and is used to decrypt the second collision report 138-2 from the second vehicle 102. The vehicle database 118 can store the driver license information 126 for each user associated with the first vehicle 100. The driver license information 126 includes a driver's name, a license number, an address, an age, a height, a weight, and an expiration date.

The vehicle database 118 stores the driver insurance information 128 for each user associated with the first vehicle 100. The driver insurance information 128 may include an insurance company name, an insurance policy number, and an insurance policy expiration date. The vehicle registration information 130 may include a vehicle registration number, a vehicle make, a vehicle model, a year of model, and a vehicle color.

The HMI 114 is an integrated subsystem designed to facilitate user interaction with the CDV module 112. The HMI 114 includes a combination of software and hardware that allow a user to receive and input information, thereby enabling control over various vehicle functions. The HMI 114 includes a touchscreen display mounted in the first vehicle's 100 dashboard, which also may serve as a central interface for accessing navigation, entertainment, climate control, and vehicle status information (e.g., an infotainment system). The touchscreen can be equipped with a graphical user interface (not shown). The HMI 114 provides a first prompt requesting the user to verify if a vehicle identified in the image data is correct. The first prompt includes a "yes" response indication and a "no" response indication. The HMI 114 provides a second prompt requesting an input to determine if the user would like to exchange a collision report with the second vehicle 102. The second prompt includes a "yes" response indication and a "no" response indication. The HMI 114 displays a display message indicating that the first vehicle 100 and the second vehicle have conducted a successful exchange of respective collision reports.

Figure 3:
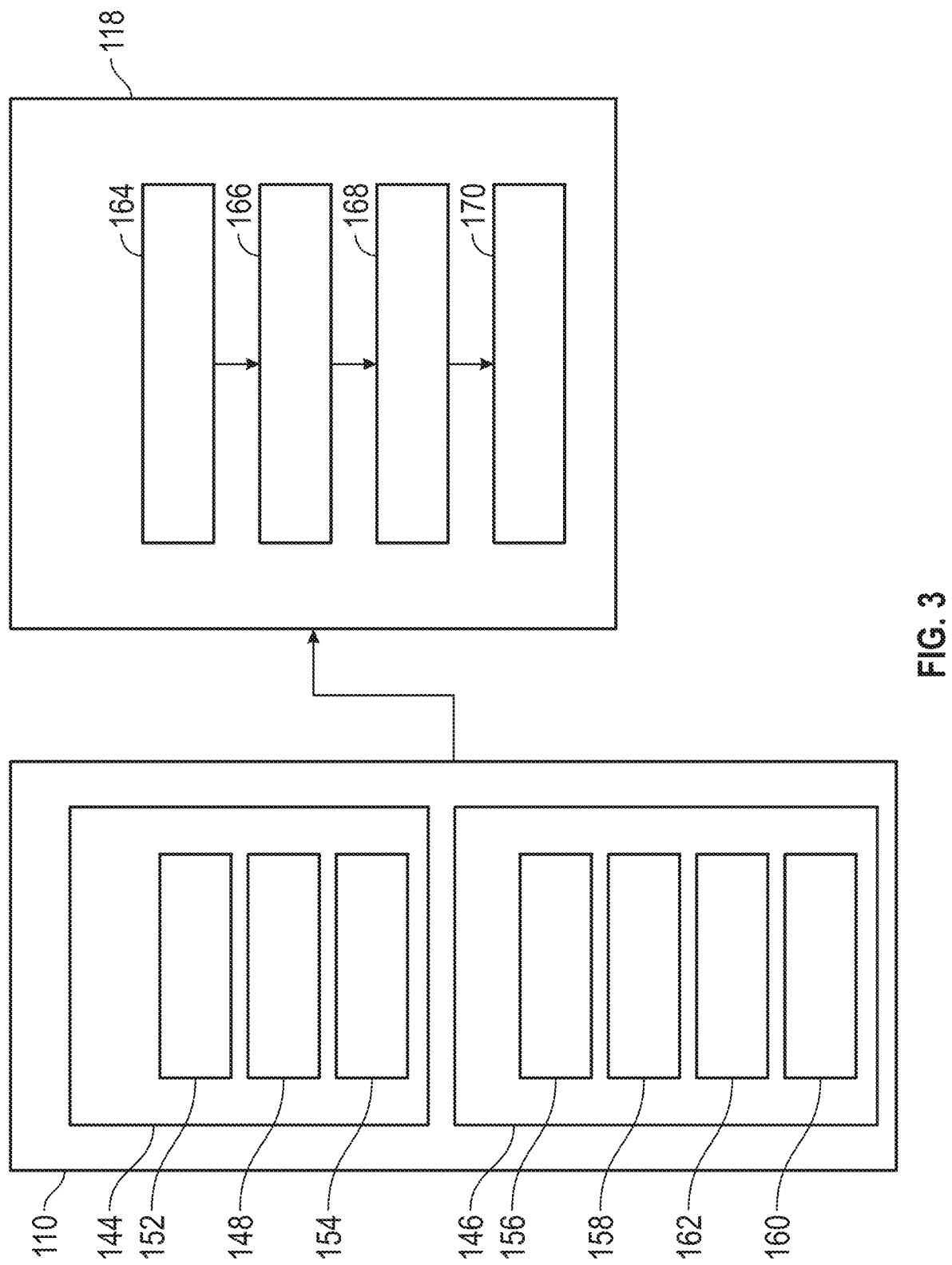
FIG. 3 illustrates a block diagram of a plurality of sensors in communication with a collision verification module according to the present disclosure.

Referring to FIG. 3, the sensors 110 include, but are not limited to, a plurality of vehicle or collision-related sensors 144 and a plurality of image sensors 146. The collision-related sensors 144 capture and transmit vehicle data that indicates a change in the first vehicle's motion, acceleration, or impact. In this example, the collision-related sensors 144 include an accelerometer 148, a gyroscope 150, an impact sensor 152, and a brake pedal sensor 154. The image sensors 146 capture field of view (FoV) and image data within a predetermined range (e.g., 0 to 250 meters) of the first vehicle 100. The image sensors 146 include a LiDar sensor 156, a radar sensor 158, a camera sensor 160, an ultrasound sensor 162, or the like. The LiDar sensor 156 detects environmental mapping, blind spot detection, and a predetermined range surrounding of the first vehicle 100. The radar sensor 158 employs long range coverage (e.g., pedestrian detection, further down the road, detection for emergency detection) and short/medium range coverage (cross traffic, rear collision) for detection. Additionally, the radar sensor 158 is configured to detect objects such as a nearby vehicle, a pedestrian, or the like. The radar sensor 158 calculates the range or distance of the target from the radar sensor 158 by emitting waves and receiving reflected waves off a detected object to determine distance. In another example, the camera sensor 160 provides images (in the form of pictures or video) detailing the predetermined range of a surrounding area of the first vehicle 100 along with lane departures coverages, object recognition.

The CDV module 112 receives the real-time, sensed data and determines if the collision event occurred with an object 120 based on the sensed data 111. The CDV module 112 includes a sensor fuser 164, a collision detector 166, a vehicle verifier 168, and a cryptographer 170. The sensor fuser 164 is in communication with the image sensors 146 and the collision detector 166. The sensor fuser 164 receives real time image data from at least two of the image sensors 146 to capture different aspects of the surrounding of the first vehicle 100, such as distance to a nearest object, acceleration, and environmental conditions. Using a sensor fusion algorithm, the sensor fuser 164 filters, correlates, and synthesizes image data from individual sensors to overcome the limitations of individual image sensors 146 and improve overall perception accuracy. The sensor fuser 164 outputs fused image data and a distance to a nearest object 180.

The collision detector 166 is in communication with the sensor fuser 164 and receives the fused image data and the distance to the nearest object 180 from the sensor fuser 164. The collision detector 166 is also communication with the collision related sensors 144 and receives the sensed vehicle data from the collision related sensors 144. The collision detector 166 determines if a collision event has occurred based on the sensed vehicle data. In this example, the collision detector 166 determines that a collision event has occurred based on a collision confidence factor associated with the sensed vehicle data. The collision confidence factor (CCF) may include a collision algorithm that determines a total collision confidence factor (TCCF) for a probability of whether a collision has occurred. The CCF and TCCF factor are respectively and individually set to a predetermined range that indicates that no collision has occurred. The collision detector 166 receives the impact force data from the impact sensor 152 and increases a CCF (C1) for the impact force, if the impact force is greater than a predetermined threshold for the impact force. The collision detector 166 also receives the acceleration data from the accelerometer 148 and increases a CCF (C2) for the acceleration if a change in acceleration spikes above a predetermined threshold for the acceleration of the first vehicle 100. The collision detector 166 receives the distance to the nearest object from the sensor fuser 164 and calculates a CCF (C3) for the distance if the distance to the nearest object 120 is greater than a predetermined threshold for distance. The collision detector 166 also receives a change in brake pedal position from the brake pedal sensor 154, which is associated with a brake pedal (not shown) of the first vehicle 100, and increases a CCF (C4) for the change in the brake pedal position if the change in brake pedal position is greater than a predetermined threshold for the brake pedal position. The collision detector determines a TDDF based on C1, C2, C3, C4, to determine whether a collision has occurred between the first vehicle 100 and the nearest object 120. The collision detector compares the TCCF to a predetermined threshold. If the TCCF is greater than the predetermined threshold for the CCF, the collision detector 166 determines that a collision occurred between the first vehicle 100 and the nearest object 120. In another example, the collision detector 166 determines a location of the impact based on the location of the impact sensor that transmitted the impact data. Once the collision has been detected, the communication module 116 generates and broadcasts the first collision message to nearby vehicles. The communication module 116 also stores a first broadcast collision message in the vehicle database 118.

The collision detector 166 receives the fused image data to also determine the nearest object to the first vehicle 100 based on the distance to the nearest object and an image processing model. The image processing model includes a convolution neural network (CNN) used to analyze the fused image data to detect the presence of nearby objects. In doing so, the CNN extracts key features such as edges, contours, and textures to differentiate between objects. Using the distance to the nearest object 180, the collision detector 166 identifies the nearest object 120 in the fused image data.

Upon detection of the nearest object 120, the collision detector 166 determines a classification of the object based on attributes such as size, shape, and color. The classification may include a human, a vehicle, a dog, a sign, a light post, a barrier, or other stationary objects. If the nearest object 120 is classified as a vehicle, the collision detector 166 uses the fused image data based on vehicle make, vehicle model, and vehicle color. Once so confirmed, the object 120 is referenced as the classified vehicle 120.1. The collision detector 166 receives, via the HMI 114, a user input to confirm whether the classified vehicle 120.1 in the image data is the same vehicle (namely, the second vehicle 102) that collided with the first vehicle 100. Once so confirmed, the object 120 is referenced as the confirmed vehicle 120.2.

The verifier 168 is in communication with the collision detector 166 and performs a verification process on the second collision message that is broadcasted by a nearby vehicle. The verification process determines whether an identity of the nearby vehicle 180 associated with the second collision message is a same vehicle as the confirmed vehicle 120.2 that is associated with the image data. In this example, the verifier 168 scans a predetermined distance within a predetermined a degree around a surrounding area of the first vehicle 100. The verifier 168 detects and receives the second collision message and analyzes the second collision message to determine whether the vehicle that broadcasted the second collision message is within a range equal or about the same range as the confirmed vehicle 120 of the image data. The verifier 168 determines whether a time frame of the collision is within a temporal window of the collision associated with the collision of the first vehicle 100. The verifier 168 determines that vehicle broadcasting the second collision message matches the confirmed vehicle 120.2 based on respective collision time frames, respective vehicle locations, and respective vehicle make, vehicle model and vehicle colors. The verifier 168 compares a first distance to the confirmed vehicle 120.2 to a second distance from the second collision message. If the distances correspond, then the confirmed vehicle 120.2 is verified. Once so verified, the object 120 is referenced as the verified vehicle 120.3. The verifier 168 generates a first collision report and stores it in the vehicle database 118.

Still referring to FIG. 3, the cryptographer 170 is configured to encode and/or decode (using an asymmetric cryptographic system) confidential data that is securely transmitted from the first vehicle 100 and received from the nearby vehicle 180 or a verified vehicle 120.3, respectively and vice versa. The cryptographer 170 is in communication with the verifier 168, the vehicle database 118 and the communication module 116. The cryptographer 170 encrypts the first collision report associated with the first vehicle using a public key. The cryptographer 170 receives and decodes an encrypted second collision report using the private key.

Figure 4:
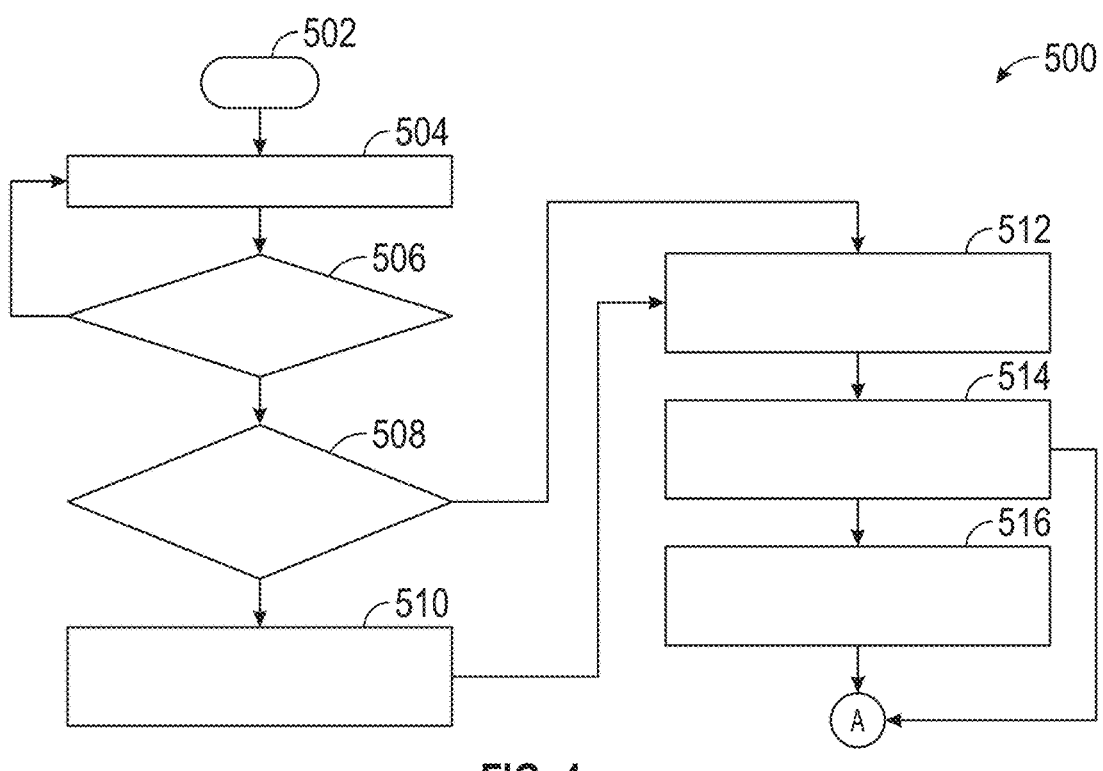
FIG. 4 illustrates a flow chart of a method of detecting and exchanging collision report with the second vehicle according to the present disclosure.

Now referring to FIG. 4, the present disclosure provides a method 500 for the collision detection verification subsystem 108 of the first vehicle to detect a collision event and exchange respective collision report with the second vehicle. Utilizing the method 500, the collision detection verification subsystem 108 of the first vehicle initiates at 502. The collision detection verification subsystem 108 captures real-time sensed data from the plurality of sensors at step 504. The sensed data includes vehicle data and image data of the surrounding environment of the first vehicle. At step 506, the collision detection verification subsystem 108 determines whether a collision event has occurred based on the sensed data. If yes, the collision detection verification subsystem 108 proceeds to step 508. If no, the collision detection verification subsystem 108 returns to step 504 to continue acquiring sensed data.

At step 508, the collision detection verification subsystem 108 analyzes the image data to determine whether the nearby object is classified as a vehicle when the collision event has been detected, using an image processing technique. In order to do so, the collision detection verification subsystem fuses the image data from the plurality of sensors to determine a distance to a nearest object. Using the distance to the nearest object, the collision detection verification subsystem 108 selects the nearest object and classifies that object. If the nearby object is classified as a vehicle, the collision detection verification subsystem 108 proceeds to step 510. If the object is not classified as a vehicle, the collision detection verification subsystem 108 proceeds to step 512.

After determining the nearest object 120 is a classified vehicle, the collision detection verification subsystem 108 confirms whether classified vehicle is correctly identified in the collision with the first vehicle based on vehicle make, vehicle model, and vehicle color at step 510. Once the classified vehicle has become a confirmed vehicle, the collision detection verification subsystem 108 proceeds to step 512.

At step 512, the collision detection verification subsystem 108 generates a data packet having a first collision message. At step 514, the collision detection verification subsystem 108 stores the first collision message in the vehicle database 118. The collision detection verification subsystem 108 may also transmit the first collision message to a cloud-based database (not shown). At step 516, the collision detection verification subsystem 108 executes a low-latency communication protocol and broadcasts the first collision message to allow any nearby vehicle to rapidly process the first collision message.

Figure 5:
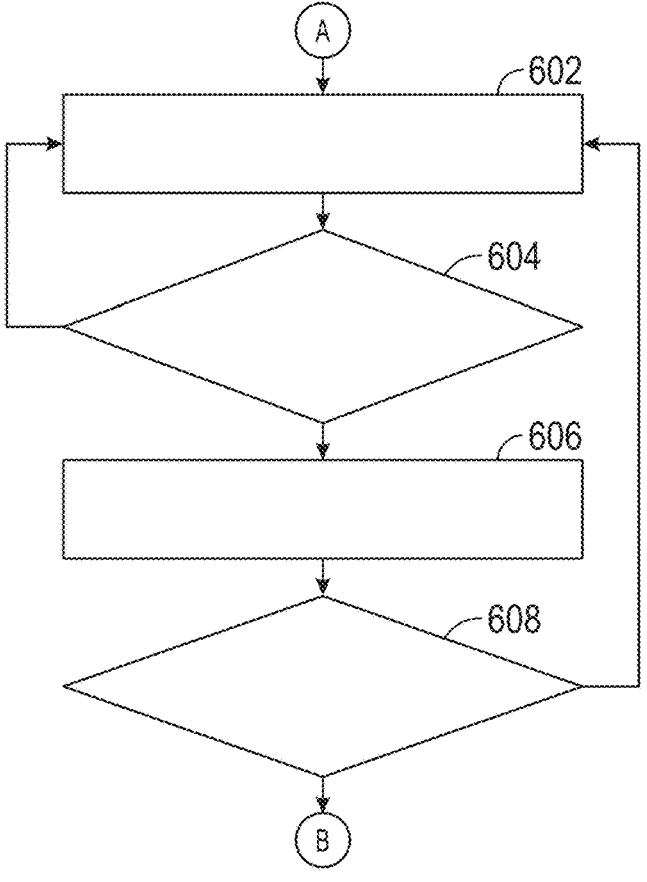
FIG. 5 illustrates a continuation of the flow chart of FIG. 4 according to the present disclosure.

The collision detection verification subsystem 108 transitions at A of the method 500 to exchange driver insurance information with a second vehicle 102. With reference now to FIG. 5, the collision detection verification subsystem 108 scans a predetermined distance around a surrounding area of the first vehicle 100 to detect a second collision message from a nearby vehicle 180 at step 602. The collision detection verification subsystem 108 proceeds to determine whether the second collision message has been received from the nearby vehicle 180 at step 604. At step 606, the collision detection verification subsystem 108 identifies the nearby vehicle based on the nearby vehicle's attributes contained within the second collision message. The vehicles attributes of the second collision message include, but are not limited to, the vehicle make, vehicle model, and vehicle color. The vehicle attributes also include GPS coordinates, time of collision, and the like.

Once the classified vehicle has been confirmed, the collision detection verification subsystem 108 proceeds to step 608. Using the vehicle attributes, the collision detection verification subsystem 108 performs a verification process on the second collision message to determine whether the identity of the nearby vehicle 180 is associated with the second collision message is a same identity as the confirmed vehicle identified in the image data at step 610. The collision detection verification subsystem 108 compares the confirmed vehicle 120.2 attributes of the image data to vehicle attributes from the second collision message to find a match. In another example, the collision detection verification subsystem 108 also compares information such as its GPS coordinates, time of collision, location of impact to similar information found in the second broadcasted collision event to the respective its GPS coordinates, time of collision, location of impact of the first vehicle 100. If the data from the second collision message is the same or similar to the confirmed vehicle of the image data, the collision detection verification subsystem 108 transitions at B to initiate a data exchange. If not, the collision detection verification subsystem 108 returns to step 602 and scans for another collision message from another nearby vehicle.

Figure 6:
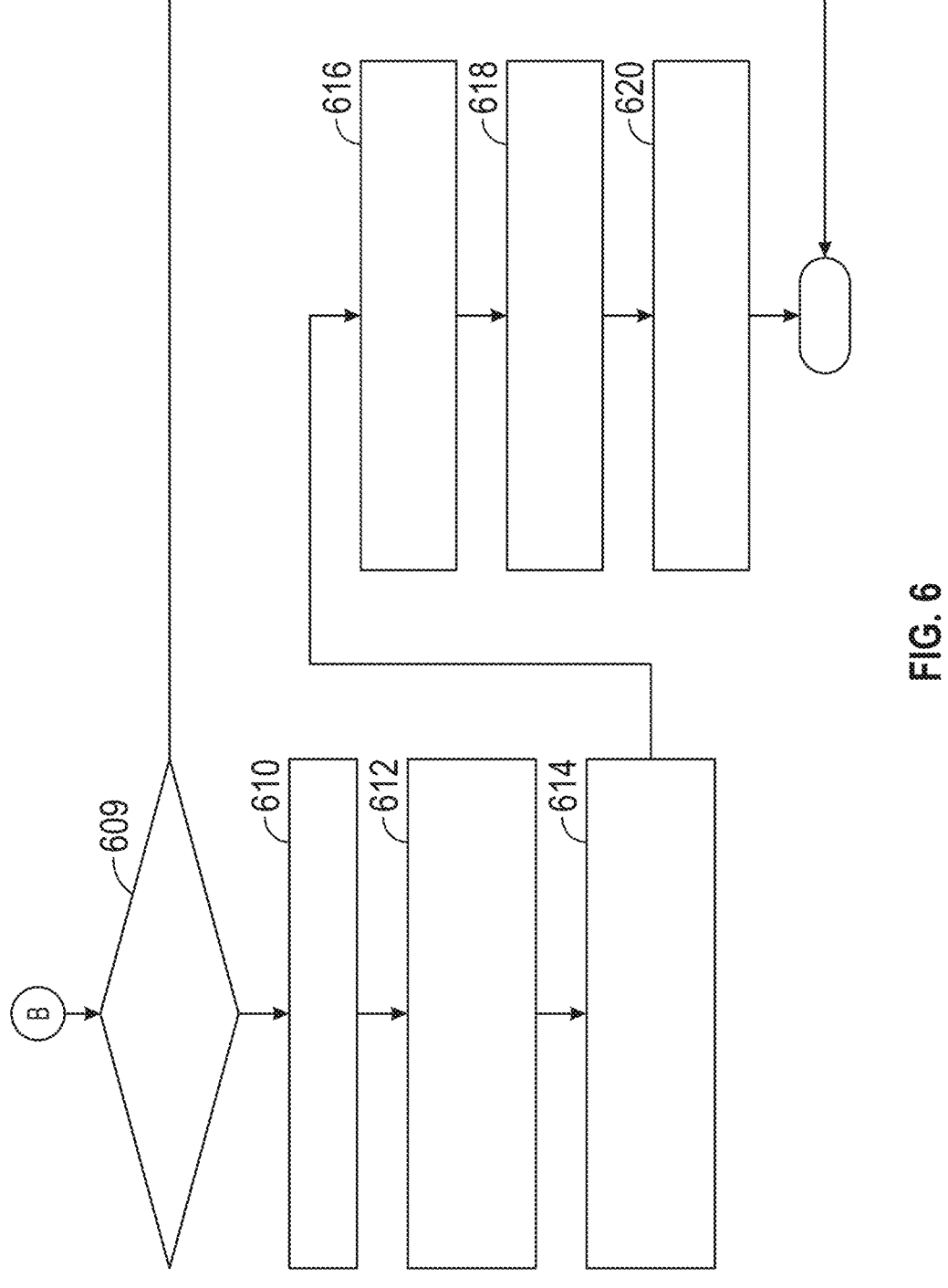
FIG. 6 illustrates a continuation of the flow chart of FIG. 5 according to the present disclosure.

Now referring to FIG. 6, the collision detection verification subsystem 108 begins an exchange of a first and second collision report 136, 138 with the verified vehicle 120.3. The collision detection verification subsystem 108 determines whether to exchange respective collision reports with the second vehicle 102 (i.e. the verified vehicle 120.3) at step 609. The collision detection verification subsystem 108 prompts a user, via the HMI 114, for an input to indicate whether to exchange collision reports to the second vehicle 102. If "yes," the collision detection verification subsystem 108 proceeds to step 610. If "no," the collision detection verification subsystem 108 jumps to END.

At step 610, the collision detection verification subsystem 108 generates a first collision report. The first collision report includes a driver insurance record of a user associated with the first vehicle 100, the image data of the collision event related to the first vehicle 100, time, data and location of the detected collision related to the first vehicle 100, a description of the impact, and a location of the impact on the first vehicle 100. At step 612, the collision detection verification subsystem 108 employs an encryption algorithm to encrypt and secure the first collision report. The collision detection verification subsystem 108 is equipped with a pair of cryptographic keys, such as a public key and a private key. The public key is shared with other vehicles and the private key is kept confidential. The encryption algorithm uses the public key to encrypt a data packet containing the first collision report. After encrypting the first collision report, the collision detection verification subsystem 108 transmits the first collision report to the second vehicle 102 and proceeds to step 616.

During the exchange process, the collision detection verification subsystem 108 receives an encrypted second collision report from the second vehicle 102 at step 616. The collision detection verification subsystem 108 decrypts the encrypted second collision report using its private key at step 618. The collision detection verification subsystem 108 uses a decryption process to convert the encrypted second collision report into its unencrypted second collision report. The second collision report includes at least a driver insurance record associated with a driver of the second vehicle, the image and video related data of the collision related to the second vehicle, time, data and location of the detected collision related to the second vehicle, a description of the impact to the second vehicle, and a location of the impact on the second vehicle.

At step 618, the collision detection verification subsystem 108 stores the first and second collision reports, respectively into the vehicle database. At step 620, the collision detection verification subsystem displays at least a portion of the second collision report from the second vehicle 102, using the HMI 114. The collision detection verification subsystem 108 displays the driver insurance record data of the second collision report associated with the user of the second vehicle 102. Once completed, the method 500 terminates at END.

Figure 7:
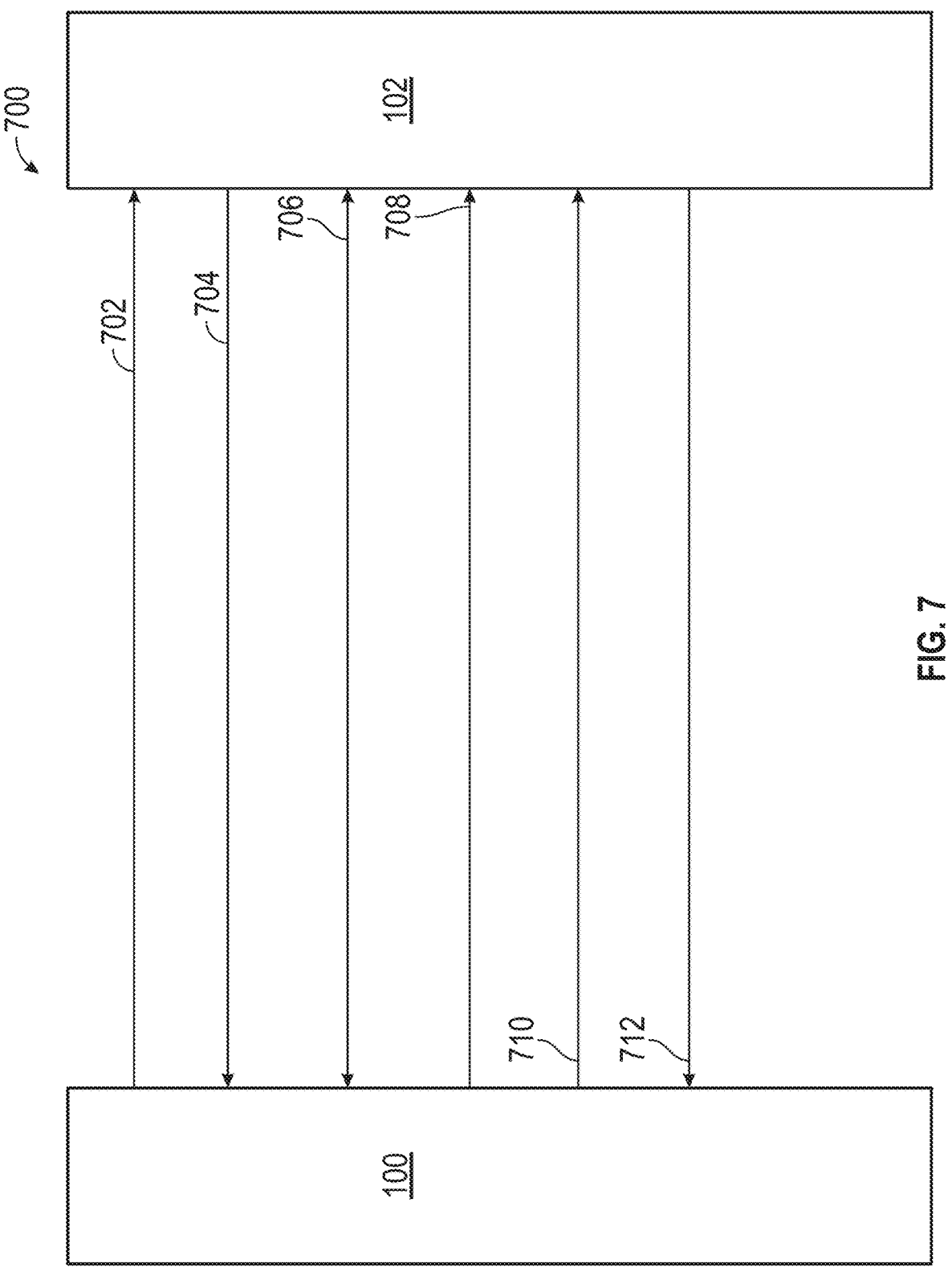
FIG. 7 illustrates a communication exchange between the first vehicle and the second vehicle of FIG. 1 according to the present disclosure.

Now referring to FIG. 7, the information exchange 700 over the V2V communication between the first vehicle 100 and the second vehicle 102 is detailed. The first vehicle 100 broadcasts an encrypted first collision message (702) to all nearby vehicles within a first predetermined range. The second vehicle 102 broadcasts an encrypted second collision message (704) to all nearby vehicles within a second predetermined range. After the first vehicle 100 verifies the second vehicle 102 as the one involved in its collision, the first and second vehicles 100, 102 execute a V2V handshake to establish a secure connection (706) for exchanging respective collision reports. The first vehicle 100 requests a response from the second vehicle 102 (708) to determine if the second vehicle 102 desires a collision report, such as insurance information data with the first vehicle 100. After initiating the V2V protocol communication with the second vehicle 102, the first vehicle 100 transmits an encrypted first collision report (708) to the second vehicle 102 via the V2V protocol communication link. The second vehicle 102 transmits an encrypted second collision report (712) to the first vehicle 100. The encrypted first collision report and the encrypted second collision report are exchanged about or near the same time.

While at least one illustrative variation has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

rance information associated with the first vehicle and the encrypted second collision report includes a second driver insurance information associated with the second vehicle, and wherein the verified vehicle is the second vehicle; and displaying, using a human machine interface, a second decrypted driver insurance record based on the second encrypted driver insurance record and a decryption process.

What is claimed is:

1. A system in a first vehicle for automatically exchanging collision reports with a second vehicle, the vehicle system comprising:

a vehicle database configured to store a driver insurance record, the driver insurance record includes insurance information, a driver license information, and a vehicle registration information related to a least one user of the first vehicle;

a plurality of sensors configured to acquire real-time vehicle data based on detecting a collision event of the first vehicle with an object and identifying the object, wherein the real-time vehicle data includes vehicle data and image data of a surrounding environment of the first vehicle; and a collision detection verification module in electrical communication with the plurality of sensors and the vehicle database; and wherein the collision detection module comprises of:

a non-transitory memory storing programming instructions; and a processor communicatively coupled with the non-transitory memory, wherein the processor executing the programming instructions is configured to:

acquire sensed vehicle data from the plurality of sensors distributed through the first vehicle, wherein the sensed vehicle data includes real-time vehicle data of the surrounding environment of the first vehicle;

detect whether a collision event has occurred between the first vehicle and the second vehicle based on the sensed vehicle data acquired;

detect whether the collision event has occurred regarding the first vehicle with a nearest object;

broadcast a first collision message when the collision event has occurred;

analyze the image data of the sensed vehicle data to determine whether the nearest object is classified as a classified vehicle when the collision event has been determined, using image processing;

scan a predetermined range around the surrounding area of the first vehicle to detect a second collision message broadcasted from a nearby vehicle;

perform a verification process on the second collision message to determine whether an identity of the nearby vehicle associated with the second collision message is a same identity as the classified vehicle, wherein the step of performing the verification process on the second collision message comprises:

process the image data, using an image processing technique, to determine a second vehicle make, a second vehicle model, and a second vehicle color of the classified vehicle associated with the image data;

compare a nearby vehicle make, a nearby vehicle model and a nearby vehicle color associated of the nearby vehicle that broadcasted the second collision message to a classified vehicle make, a classified vehicle model and a classified vehicle color associated with the classified vehicle identified in the image data; and transmit the first collision report based on the nearby vehicle being identified as the second vehicle of the image data; and exchange a first collision report from the first vehicle with a second collision report from the second vehicle based on the collision event and the nearby vehicle being identified as the second vehicle of the image data, wherein the first collision report includes a first driver insurance information associated with the first vehicle and the second collision report includes a second driver insurance information associated with the second vehicle.

2. The vehicle system of claim 1, wherein the processor executing the programming instructions is configured to:

encrypt the first collision report with a public key, when the nearby vehicle shares the same identity as that of the classified vehicle of the image data and is referred to after the verification process as a verified vehicle;

exchange a first encrypted collision report of the first vehicle for a second encrypted collision report associated with the verified vehicle, wherein the verified vehicle is the second vehicle; and display, using a human machine interface, a second decrypted driver insurance record based on the second encrypted driver insurance record and a decryption process.

3. The vehicle system according to claim 1, wherein the plurality of sensors comprises a group consisting of: a camera device, LiDar sensor, a RADAR sensor, an impact sensor, an accelerometer, a brake pedal, an ultrasound sensor, or a combination thereof.

4. The vehicle system according to claim 3, wherein the processor executing the programming instructions is configured to:

acquire the image data from at least two of the plurality of sensors;

fuse the image data using a sensor fusing algorithm;

analyze a fused image data to detect an object nearest to the first vehicle, wherein the object nearest to the first vehicle becomes a nearest object;

determine a distance between the first vehicle and the nearest object detected;

perform an image processing technique on the image data to determine a classification of the nearest object detected; and classify the nearest object as the second vehicle.

5. The vehicle system according to claim 1, wherein the verification process further comprises verifying the nearby vehicle as the second vehicle when the nearby vehicle is within a predetermined distance threshold of the first vehicle and the second vehicle based on the distance between the first vehicle and the second vehicle.

6. The vehicle system according to claim 1, wherein the verification process further comprises verifying the nearby vehicle is not the second vehicle when the nearby vehicle is not within a predetermined distance threshold of the first vehicle and the second vehicle based on the distance between the first vehicle and the second vehicle.

7. The vehicle system according to claim 1, wherein the first collision message comprises a collision event and at least one of a vehicle global positioning location data, a vehicle make, a vehicle color, a vehicle model, or a combination thereof.

8. The vehicle system according to claim 1, wherein the processor executing the programming instructions is configured to:

receive the second collision message broadcasted from the nearby vehicle about a same or similar time frame as the first vehicle detects the collision event; and transmit the first collision report based on the second collision message associated with the nearby vehicle.

9. The vehicle system according to claim 1 wherein the processor executing the programming instructions is configured to:

determine whether to exchange the first collision report from the first vehicle with the second collision report from the nearby vehicle;

prompt an input from a user of the first vehicle to determine whether to exchange, with the second vehicle, the first collision report for the second collision report; and transmit, to the second vehicle, the first collision report based on the input associated with the prompt to determine whether to exchange the first collision report and the second collision report.

10. A method of a vehicle system for a first vehicle that automatically exchanges collision reports with a second vehicle, the method comprising:

acquiring sensed vehicle data from a plurality of sensors distributed through the first vehicle, wherein the sensed vehicle data includes real-time vehicle data and image data of a surrounding environment of the first vehicle;

detecting whether a collision event has occurred between the first vehicle and the second vehicle based on the sensed vehicle data acquired;

detecting whether the collision event has occurred regarding the first vehicle with a nearest object;

broadcasting a first collision message when the collision event has occurred;

analyzing the image data of the sensed vehicle data to determine whether the nearest object is classified as a classified vehicle when the collision event has been determined, using image processing;

scanning a predetermined range around the surrounding area of the first vehicle to detect a second collision message broadcasted from a nearby vehicle;

performing a verification process on the second collision message to determine whether an identity of the nearby vehicle associated with the second collision message is a same identity as the classified vehicle, wherein the step of performing the verification process on the second collision message comprises:

processing the image data, using an image processing technique, to determine a second vehicle make, a second vehicle model, and a second vehicle color of the classified vehicle associated with the image data; and comparing a nearby vehicle make, a nearby vehicle model and a nearby vehicle color associated of the nearby vehicle that broadcasted the second collision message to a classified vehicle make, a classified vehicle model and a classified vehicle color associated with the classified vehicle identified in the image data; and exchanging a first collision report from the first vehicle with a second collision report from the second vehicle based on the collision event and the nearby vehicle being identified as the second vehicle of the image data, wherein the first collision report includes a first driver insurance information associated with the first vehicle and the second collision report includes a second driver insurance information associated with the second vehicle.

11. The method according to claim 10 further comprising:

encrypting the first collision report with a public key, when the nearby vehicle shares the same identity as that of the classified vehicle of the image data and is referred to after the verification process as a verified vehicle;

exchanging a first encrypted collision report of the first vehicle for a second encrypted collision report associated with the verified vehicle, wherein the verified vehicle is the second vehicle; and displaying, using a human machine interface, a second decrypted driver insurance record based on the second encrypted driver insurance record and a decryption process.

12. The method according to claim 11, wherein the verification process further comprises verifying the nearby vehicle as the second vehicle when the nearby vehicle is within a predetermined distance threshold of the first vehicle and the second vehicle based on the distance between the first vehicle and the second vehicle.

13. The method according to claim 11, wherein the verification process further comprises verifying the nearby vehicle is not the second vehicle when the nearby vehicle is not within a predetermined distance threshold of the first vehicle and the second vehicle based on the distance between the first vehicle and the second vehicle.

14. The method according to claim 10, wherein the plurality of sensors comprises a group consisting of: a camera device, LiDar sensor, a RADAR sensor, an impact sensor, an accelerometer, a brake pedal, an ultrasound sensor, or a combination thereof.

15. The method according to claim 14 further comprising:

acquiring the image data from at least two of the plurality of sensors;

fusing the image data using a sensor fusing algorithm;

analyzing a fused image data to detect an object nearest to the first vehicle;

determining a distance between the first vehicle and the nearest object detected;

performing an image processing technique on the image data to determine a classification of the nearest object detected; and classifying the nearest object as the second vehicle.

16. The method according to claim 10, wherein the first collision message comprises a collision event and at least one of a vehicle global positioning location data, a vehicle make, a vehicle color, a vehicle model, or a combination thereof.

17. The method according to claim 10 further comprising:

receiving the second collision message broadcasted from the nearby vehicle about a same or similar time frame as the first vehicle detects the collision event; and transmitting the first collision report based on the second collision message associated with the nearby vehicle.

18. A method of a vehicle system for a first vehicle that automatically exchanges collision reports with a second vehicle, the method comprising:

acquiring sensed vehicle data from a plurality of sensors distributed through the first vehicle, wherein the sensed vehicle data includes real-time vehicle data and image data of a surrounding environment of the first vehicle, wherein the acquiring the sensed vehicle data comprises:

acquiring the image data from at least two of the plurality of sensors;

fusing the image data using a sensor fusing algorithm;

analyzing a fused image data to detect an object nearest to the first vehicle;

determining a distance between the first vehicle and the nearest object detected;

performing an image processing technique on the image data to determine a classification of the nearest object detected; and classifying the nearest object as the second vehicle;

detecting whether a collision event has occurred between the first vehicle and the second vehicle based on the sensed vehicle data acquired;

broadcasting a first collision message when the collision event has occurred;

scanning a predetermined range around the surrounding area of the first vehicle to detect a second collision message broadcasted from a nearby vehicle;

performing a verification process on the second collision message to determine whether an identity of the nearby vehicle associated with the second collision message is a same identity as the classified vehicle, wherein the performing of the verification process on the second collision message includes:

processing the image data, using an image processing technique, to determine a second vehicle make, a second vehicle model, and a second vehicle color of the classified vehicle associated with image data; and comparing a nearby vehicle make, a nearby vehicle model and a nearby vehicle color associated of the nearby vehicle that broadcasted the second collision message to a classified vehicle make, a classified vehicle model and a classified vehicle color associated with the classified vehicle identified in the image data;

encrypting the first collision report with a public key, when the nearby vehicle shares the same identity as that of the classified vehicle of the image data and is referred to after the verification process as a verified vehicle;

exchanging a first encrypted collision report of the first vehicle for a second encrypted collision report associated with the verified vehicle and the collision event, wherein the first encrypted collision report includes a first driver insurance information associated with the first vehicle and the second encrypted collision report includes a second driver insurance information associated with the second vehicle, and wherein the verified vehicle is the second vehicle; and displaying, using a human machine interface, a second decrypted driver insurance record based on the second encrypted driver insurance record and a decryption process.

\* \* \* \* \*